United States Patent
Ballet et al.

(10) Patent No.: US 11,287,674 B2
(45) Date of Patent: Mar. 29, 2022

(54) SPECTACLE LENS COMPRISING AN ACTIVABLE OPTICAL FILTER

(71) Applicant: Essilor International, Charenton-le-Pont (FR)

(72) Inventors: Jerome Ballet, Charenton-le-Pont (FR); Samuel Archambeau, Charenton-le-Pont (FR); Jean-Paul Cano, Charenton-le-Pont (FR); Frederic Arrouy, Charenton-le-Pont (FR); Loic Quere, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 242 days.

(21) Appl. No.: 16/487,707

(22) PCT Filed: Feb. 20, 2018

(86) PCT No.: PCT/EP2018/054191
§ 371 (c)(1),
(2) Date: Aug. 21, 2019

(87) PCT Pub. No.: WO2018/153878
PCT Pub. Date: Aug. 30, 2018

(65) Prior Publication Data
US 2021/0072562 A1 Mar. 11, 2021

(30) Foreign Application Priority Data
Feb. 22, 2017 (EP) ..................................... 17305192

(51) Int. Cl.
*G02C 7/10* (2006.01)
*G02F 1/1503* (2019.01)
*G02F 1/153* (2006.01)

(52) U.S. Cl.
CPC ............ *G02C 7/101* (2013.01); *G02C 7/105* (2013.01); *G02C 7/108* (2013.01); *G02F 1/1503* (2019.01); *G02F 1/153* (2013.01)

(58) Field of Classification Search
CPC ........ G02C 7/101; G02C 7/105; G02C 7/108; G02C 7/104; G02F 1/1503; G02F 1/153
See application file for complete search history.

(56) References Cited

U.S. PATENT DOCUMENTS

| 4,752,119 A | 6/1988 | Ueno et al. |
| 2013/0293825 A1 | 11/2013 | Trajkovska et al. |

(Continued)

FOREIGN PATENT DOCUMENTS

| EP | 2 848 669 A1 | 3/2015 |
| WO | WO 2013/106921 A1 | 7/2013 |

(Continued)

OTHER PUBLICATIONS

International Search Report and Written Opinion dated May 28, 2018 in PCT/EP2018/054191 filed Feb. 20, 2018.

*Primary Examiner* — Tuyen Tra
(74) *Attorney, Agent, or Firm* — Oblon, McClelland, Maier & Neustadt, L.L.P.

(57) ABSTRACT

A spectacle lens including an activable optical filter, the activable optical filter being configured to be actively switched between at least three configurations, wherein in the first configuration, the color perception of the spectacle wearer is unaltered, in the second configuration the activable optical filter provides a specific filtering function, in the third configuration vision of the spectacle wearer is protected against glare.

17 Claims, 3 Drawing Sheets

(56) References Cited

U.S. PATENT DOCUMENTS

2015/0131047 A1    5/2015   Saylor et al.
2016/0282694 A1    9/2016   Biver et al.
2017/0102558 A1    4/2017   Saylor et al.

FOREIGN PATENT DOCUMENTS

WO    WO 2013/148523 A1    10/2013
WO    WO 2013/169987 A1    11/2013

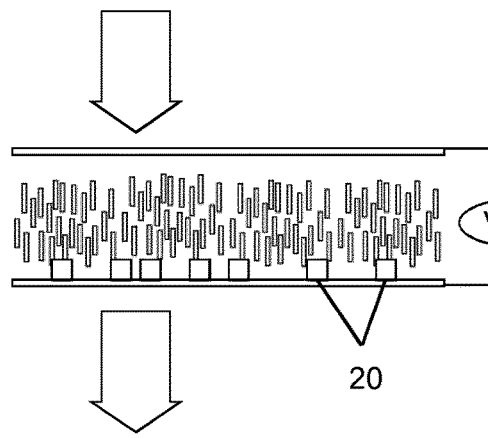
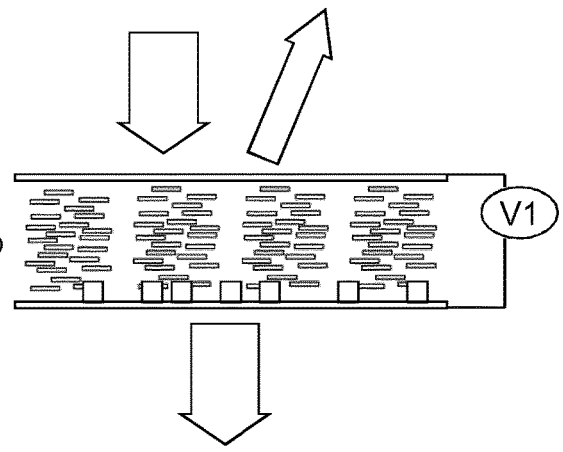
FIG.2a  FIG.2b
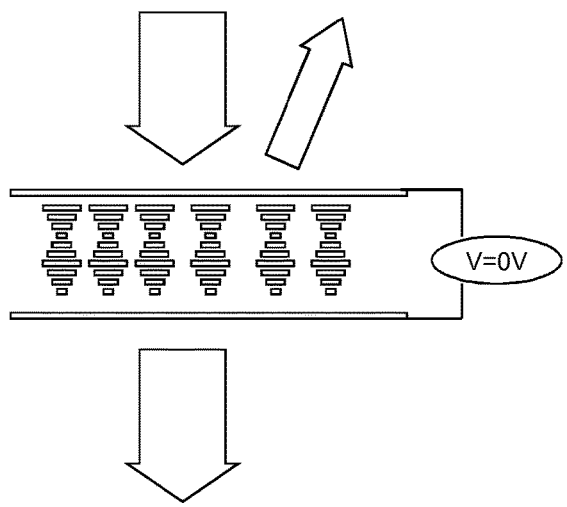
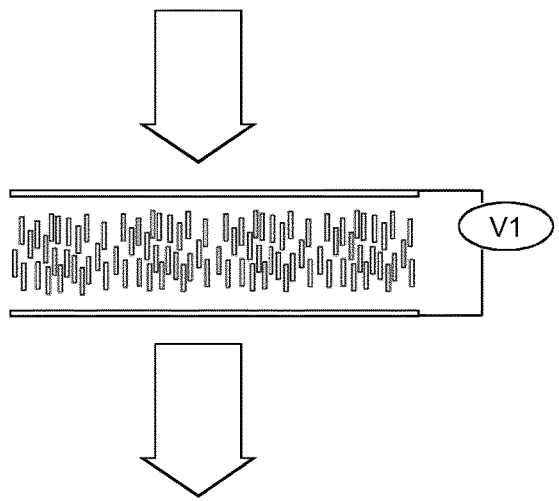
FIG.3a  FIG.3b

SPECTACLE LENS COMPRISING AN ACTIVABLE OPTICAL FILTER

FIELD OF THE INVENTION

The invention relates to a spectacle lens comprising an activable optical filter being configured to be switched between at least three configurations.

BACKGROUND OF THE INVENTION

During life, individuals have their eyes exposed to strong luminosity, which generates discomfort and glare. Solar lenses or sunglasses protect the eyes from glare but are not systematically worn when high luminosity is rare and last a short time, particularly in the winter, fall and spring and thus no protection is provided during that time. There is a need to provide eyeglasses able to switch from a clear state to a low light transmission state.

Photochromic lenses meet this need, as they darken upon exposure to UV rays, usually associated with strong natural luminosity. However, photochromic lenses are passive and can not be activated on demand by spectacle wearer or automatically in specific conditions. In addition, photochromic lenses are usually not activated by artificial light or indoor.

Activable solar lenses exist, based on liquid crystals or electrochromic systems for instance. Such activable solar lenses can be switched from a clear state to a low light transmission state so as to protect the eyes of the wearer from strong luminosity.

It would be highly desirable to have an intermediate state in activable solar lenses, said intermediate state being able to filter a maximum of the potentially harmful wavelengths such as high energy blue light, increase contrast or visual comfort in some situation.

Passive filters exist and partially modulate the spectrum of light received by the eye. However, passive filters have drawbacks.

First, the residual color of light transmitted through passive optical filters (due to filtering in the visible range) can be very pronounced for strong levels of filtering and/or broad rejected spectral ranges. For example, with a high level of blue-violet light filtering, the residual color is yellow and can significantly degrade the aesthetics of the spectacle lens, degrade color perception of the wearer, making it less comfortable and aesthetic for the wearer.

Secondly, the optical filter being passive, the spectral filtering functions cannot be activated at the most appropriate times. For a convenient photo-synchronization of circadian rhythms, filtering is required only for limited periods, at specific hours, and depends on the user's profile (shift workers, teenagers . . . ). For specific outdoor activities (cycling, golf, sailing, skiing), filtering may improve contrast. For driving, especially during night, filtering may reduce glare without impairing vision.

There is a need for a spectacle lens that would comprise an activable optical filter that could be switched, on demand by spectacle wearer or automatically, from a colored state to a more neutral color, i.e. clear or sun lens like and that would reduce light transmission when luminosity is strong without creating color distortion.

An object of the present invention is to provide a spectacle lens comprising an activable optical filter that does not present the above identified drawbacks.

SUMMARY OF THE INVENTION

To this end, the invention proposes a spectacle lens comprising an activable optical filter, the activable optical filter being configured to be actively switched between at least three configurations, wherein in the first configuration, the color perception of the spectacle wearer is unaltered and light transmitted through the activable optical filter has a chroma C*1 and hue h°1, in the second configuration light transmitted through the activable optical filter has a chroma C*2 and hue h°2, in the third configuration vision of the spectacle wearer is protected against glare and light transmitted through the activable optical filter has a chroma C*3 and hue h°3, and the chromaticity difference ΔChrom between (C*2, h°2) and (C*3, h°3) is larger than or equal to 20.

Advantageously, having very different colors of the light transmitted through the activable optical filter in the second and third configuration allows providing two different light filtering functions.

The spectacle lens according to the invention may be switched between three different configurations each of which offer a different light filtering function.

The first configuration, corresponding to a clear state, provides unaltered color perception.

The second configuration may provide a specific filtering function, such as protection against potentially harmful wavelengths, increasing contrast or visual comfort of the wearer.

The third configuration provides protection against glare.

Glare is cause of discomfort, but the feeling of discomfort is perceived differently by different people. A subjective scale rating (De Boer, proposed in 1967) aims at assessing discomfort associated to glare with outdoor lighting or vehicular headlamps. It is well accepted that lenses which reduce light transmission will lower eye exposure to light and therefore reduce discomfort. Protection against glare means reduction of transmittance.

Light transmission may be reduced uniformly over the whole visible light spectrum, or reduced selectively on some ranges of wavelength of visible spectrum, or with any filter having an average but non-uniform attenuation of light. Each of these filters can be characterized by their transmittance, which is an average value over the whole visible range.

However, lenses having low transmittance with a uniform filter may be less efficient against glare than lenses having a higher transmittance associated to a specific filtering, for instance for lenses to be used during night against light sources with narrow spectrum. In this respect, second configuration and third configuration can be combined to provide two levels of protection against glare.

Finally, the protection against glare of the third configuration has to be understood has a reduction of transmittance, in average over the whole visible spectrum or in a specific range of the visible spectrum, as compared to the first and second configurations.

Advantageously, the light transmitted through spectacle lens of the invention may have a specific color in the second configuration while having almost no perceived color in the first and third configurations.

According to further embodiments which can be considered alone or in combination:

in the first configuration, the activable optical filter has a transmittance T1 greater than or equal to 80%; and/or in the first configuration, light transmitted through the activable optical filter has chroma C*1 smaller than or equal to 15; and/or the first configuration corresponds to a non activated configuration of the activable filter; and/or in the third configuration the activable optical filter has a transmittance T3 smaller than or equal to 43%, preferably smaller than or equal to 18%, more preferably smaller than or equal to 8%; and/or in the third configuration light transmitted through the activable optical filter has a neutral color or has a chromaticity difference ΔChrom between (C*1, h°1) and (C*3, h°3) smaller than or equal to 20; and/or in the second configuration light transmitted through the activable optical filter has a chroma C*2 larger than or equal to 30, preferably larger than or equal to 50, more preferably larger than or equal to 75; and/or in the second configuration light transmittance T2 through the activable optical filter is reduced by at least 10% as compared to the transmittance T1 of first configuration, on a range of wavelength selected in the following list of wavelength ranges: from 400 nm to 460 nm, from 420 nm to 450 nm, from 465 nm to 495 nm, from 480 nm to 520 nm, from 460 nm to 520 nm, from 560 nm to 600 nm, from 580 nm to 620 nm and from 530 nm to 650 nm; and/or the activable optical filter comprises at least one cell comprising two electrochromic dye compounds having different oxidation potentials between two transparent supports and at least two transparent electrodes, the electrochromic dye compounds undergoing at least one optical property change upon application of an electrical field between the transparent supports using the at least two transparent electrodes; and/or the activable optical filter comprises two independent electrochromic cells each comprising a different electrochromic dye compound; and/or the activable optical filter comprises an electrochromic cell comprising an electrochromic dye compound and a second element configured to filter light radiations over at least one predetermined range of wavelengths, wherein the full width at half maximum of the filtering function of the activable optical filter is smaller than or equal to 100 nm; and/or the electrochromic dye compound is in the list consisting of compounds comprising one or several pyridinium rings, such as single viologen, two-core viologens, terpyridinium compounds, quaterpyridinium compounds, in particular compounds disclosed in European patent applications EP2848667, EP2848668 and EP3115433; and/or the spectacle lens comprises an ophthalmic function adapted to a wearer; and/or the activable optical filter comprises several activable elements; and/or the first configuration corresponds to all activable elements being non activated; and/or the second configuration corresponds to at least a first activable element being activated; and/or the third configuration corresponds to at least a second activable element being activated; and/or at least one activable element comprises an electrochromic dye compound; and/or at least one activable element comprises an electrochromic cell comprising an electrochromic dye compound; and/or at least one activable element is configured to filter light radiations over at least one predetermined range of wavelengths; and/or the full width at half maximum of the filtering function of the activable optical filter is smaller than or equal to 100 nm; and/or each electrochromic dye compound is positioned in one cell; and/or the electrochromic dye compounds have different oxidation potentials between two transparent supports and at least two transparent electrodes; and/or the electrochromic dye compounds undergo at least one optical property change upon application of an electrical field between the transparent supports using the at least two transparent electrodes; and/or each electrochromic cell comprises a different electrochromic dye compound; and/or the first activable element comprises an electrochromic cell comprising an electrochromic compound and the second activable element is configured to filter light radiations over at least one predetermined range of wavelengths.

The invention further relates to an optical equipment comprising spectacle lens according to the invention, and a control unit configured to control the activable optical filter so as to have the activable optical filter switch between the at least three configurations.

The optical equipment of the invention may further comprise at least one sensor configured to measure a luminosity parameter and wherein the control unit is configured to control the activable optical filter based on the luminosity parameter provided by the sensor. By optical parameter, it is meant any of the following: light intensity, light intensity in a specific range of wavelength, in particular in the range of wavelength corresponding to the second configuration of the activable optical filter, cumulated light exposure over a specific time, light intensity variation speed.

According to a further aspect, the invention also relates to a method of controlling the activable filter according to the invention.

The invention further relates to a computer program product comprising one or more stored sequences of instructions that are accessible to a processor and which, when executed by the processor, causes the processor to carry out the method according to the invention.

The invention also relates to a computer-readable storage medium having a program recorded thereon; where the program makes the computer execute the method of the invention.

The invention further relates to a device comprising a processor adapted to store one or more sequence of instructions and to carry out the method according to the invention.

BRIEF DESCRIPTION OF THE DRAWINGS

In the following, CIELab colorimetric model is used. Luminance/Lightness, Chroma C*, Hue h°, red/green position a* and yellow/blue position b* are evaluated within this colorimetric model, under standard D65 illuminant and standard observer convention (angle 10°).

The chromaticity difference ΔChrom between (C*1, h°1) and (C*2, h°2) is defined as the Euclidian distance between colours, regardless of their lightness:

$$\Delta\text{Chrom} = \sqrt{(a*1-a*2)^2 + (b*1-b*2)^2}$$

where a* and b* are the Cartesian colour coordinates corresponding to cylindrical C* and h° coordinates of the same colour.

This chromaticity difference is not the standard colour difference known as Lab ΔE, which includes the lightness component of colour. In the invention, lightness may vary significantly in various configurations, and colour comparison is limited to chromaticity.

Figure 1:
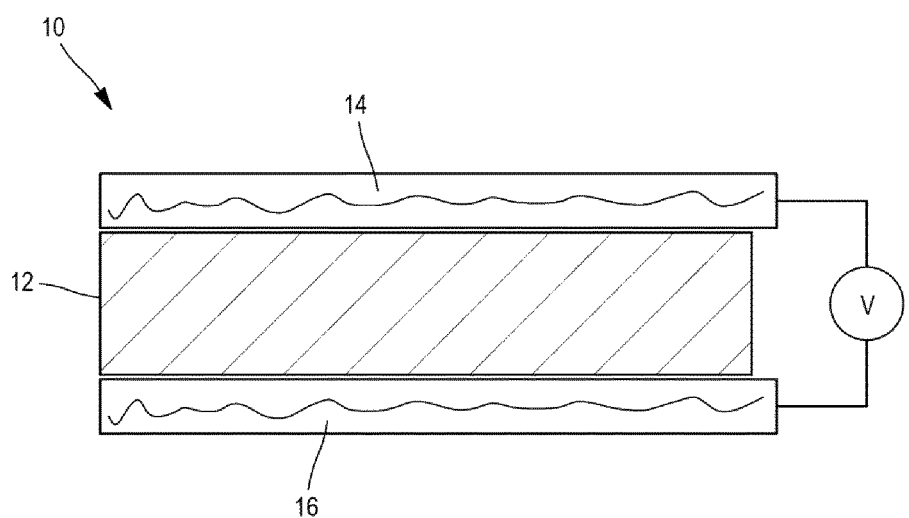

Embodiments of the invention will now be described, by way of example only, and with reference to the following drawings in which:

FIG. 1 illustrates an activable optical filter according to the invention; and

FIGS. 2a to 5b represent activable optical filters according to different embodiments of the invention.

DETAILED DESCRIPTION OF PREFERRED EMBODIMENTS

The invention relates to a spectacle lens, for example an ophthalmic lens, comprising an activable optical filter being configured to be actively switched between at least three configurations.

The activable optical filter may comprise several activable elements.

Each activable element may comprise an electrochromic dye compound, or an electrochromic cell comprising an electrochromic dye compound, or may be configured to filter light radiations over at least one predetermined range of wavelengths. The spectacle lens according to the invention may have an optical function adapted to the wearer.

In the sense of the invention, an optical function corresponds to a function providing for each gaze direction the effect of an optical lens on the light ray passing through the optical lens.

The optical function may comprise dioptric function, light absorption, polarizing capability, etc. . . .

The dioptric function corresponds to the optical lens power (mean power, astigmatism, the prismatic deviation, etc. . . . ) as a function of the gaze direction.

The spectacle lens according to the invention may have a specific optical design adapted to the wearer.

The wording "optical design" is a widely used wording known from the man skilled in the art in ophthalmic domain to designate the set of parameters allowing defining a dioptric function of an ophthalmic lens; each ophthalmic lens designer has its own designs, particularly for progressive ophthalmic lenses. As for an example, a progressive ophthalmic lens "optical design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:

a power profile along the main gaze directions (meridian line) used by the lens wearer during day life activities, distributions of powers (mean power, astigmatism, . . . ) on the sides of the lens, that is to say away from the main gaze directions.

In the first configuration, the color perception of the spectacle wearer is unaltered. In the sense of the invention the color perception of the spectacle wearer is unaltered means that the color perception of light transmitted through the activable filter in the first configuration is the same as the color perception of same light without the activable filter. In other words, the effect on the luminosity function in the first configuration is uniform.

According to an embodiment of the invention, in the first configuration the activable optical filter has a transmittance T1 greater than or equal to 80%.

In the sense of the invention and throughout the application, the "transmittance" corresponds to the luminous transmittance as defined in the ISO standard ISO13666:2012, which is the percentage of light transmitted by the activable filter over the visible spectrum.

In other words, a transmittance of 80% corresponds to 80% of the incident light over the visible spectrum being transmitted through the activable filter. Such configuration corresponds to a class 0 lens as defined in the ISO standard IS08980-3:2003.

The activable optical filter may be configured so that the light transmitted through said activable optical filter has a chroma C*1 smaller than or equal to 15. In other words, the first configuration of the activable optical filter corresponds to a clear state.

Preferably, the first configuration corresponds to a non activated configuration of the activable filter. When the activable optical filter comprises several activable elements, the non activated state, in other words the first configuration, corresponds to all activable elements being non activated.

In the second configuration, the light transmitted through the activable optical filter has a chroma C*2 and hue h°2.

According to an embodiment of the invention, the light transmitted through the activable optical filter has a chroma C*2 greater than or equal to 30, preferably greater than or equal to 50, for example greater than or equal to 75.

In other words, the second configuration corresponds to a color configuration that provides for a specific function.

For example, the activable optical filter may be configured so as to prevent harmful blue light effects on the wearer's retina in the second configuration.

To reduce the blue light-induced risk for the retina, the activable optical filter according to the invention may be configured in the second configuration to reduce transmission of light between 400 nm and 460 nm, preferably between 420 nm and 450 nm.

The activable optical filter may be configured so as to, in the second configuration, help improve chronobiology of the wearer.

For example, the activable optical filter according to the invention may be configured so that in the second configuration to filter turquoise blue between 465 nm and 495 nm for active synchronization of the circadian clock. Such embodiment is particularly advantageous for users suffering from a sleep related disorder such as insomnia, jet lag or for shift workers.

The activable optical filter may be configured so as to, in the second configuration, help increase contrasts. This may be particularly useful when the wearer is driving or practicing sport. For example, the activable optical lens may be tinted in yellow to increase contrasts.

For example, the activable optical filter according to the invention may be configured in the second configuration to filter a range of wavelengths that have a width of at least 20 nm and that is centered on mean wavelengths equal to 475 nm, in order to increase the red/green contrast.

For example, the activable optical filter according to the invention may be configured in the second configuration to filter a range of wavelengths that have a width of at least 20 nm and that is centered on mean wavelengths equal to 580 nm, in order to increase the red/green contrast.

For example, the activable optical filter according to the invention may be configured in the second configuration to filter a range of wavelengths that has a width of at least 20 nm and that is centered on a mean wavelength equal to 500 nm, in order to increase the blue/green contrast.

For example, the activable optical filter according to the invention may be configured in the second configuration to filter a range of wavelengths that has a width of at least 20 nm and that is centered on a mean wavelength equal to 600 nm, in order to reduce dazzle.

According to an embodiment of the invention, the second configuration light transmittance T2 through the activable optical filter is reduced by at least 10% as compared to the transmittance T1 of the first configuration, on a range of wavelength selected in the following list of wavelength ranges: from 400 nm to 460 nm, from 420 nm to 450 nm, from 465 nm to 495 nm, from 480 nm to 520 nm, from 460 nm to 520 nm, from 560 nm to 600 nm, from 580 nm to 620 nm and from 530 nm to 650 nm.

According to an embodiment of the invention in the second configuration, the activable optical filter may be located on the whole optical surface of the spectacle lens or on a part of the optical surface of the spectacle lens, for instance the upper part associated with far vision or the lower part associated with near vision.

In some embodiments, the activable filter in the second configuration provides with a graded tint. In this case, the chroma $C^*2$ and hue $h°2$ of light transmitted through the activable optical filter correspond to the darkest tint along the graded tint. The direction of gradient may be vertical or horizontal when the spectacle lens is worn.

When the activable optical filter comprises several activable elements, the second configuration corresponds to at least a first activable element being activated.

In the third configuration, vision of the spectacle wearer is protected against glare and light transmitted through the activable optical filter has a chroma $C^*3$ and hue $h°3$. The chromaticity difference $\Delta$Chrom between $(C^*2, h°2)$ and $(C^*3, h°3)$ is larger than or equal to 20.

In other words, in the second configuration light transmitted through the spectacle lens according to the invention has a "bright" color well differentiated from the color of the light transmitted through the spectacle lens in first and third configurations.

According to an embodiment of the invention, the third configuration corresponds to a dark configuration. Typically, in the third configuration the activable optical filter has a transmittance T3 smaller than or equal to 43%, i.e. class 2 of the ISO8980-3:2003 standard, for example smaller than or equal to 18%, i.e. class 3 of the ISO8980-3:2003 standard, or for example smaller than or equal to 8%, i.e. class 4 of the ISO8980-3:2003 standard.

In a specific embodiment, the activable optical filter is configured in the third configuration so as to have a neutral color, for example grey color having Chroma $C^*3=14$ and, Hue $h°3=292°$ or brown color having Chroma $C^*3=42$ and Hue $h°3=59°$, so that the color perception of wearer is not impacted.

According to another embodiment of the invention, in the third configuration light transmitted through the activable optical filter has a chroma $C^*3$ which has a chromaticity difference $\Delta$Chrom between $(C^*1, h°1)$ and $(C^*3, h°3)$ smaller than or equal to 20

According to an embodiment of the invention in the third configuration, the activable optical filter may be located on the whole optical surface of the spectacle lens or on a part of the optical surface of the spectacle lens, for instance the upper part associated with far vision or the lower part associated with near vision.

In some embodiments, the activable filter in the third configuration provides with a graded tint. In this case, the chroma $C^*3$ and hue $h°3$ of light transmitted through the activable optical filter correspond to the darkest tint along the graded tint. The direction of gradient may be vertical or horizontal when the spectacle lens is worn.

When the activable optical filter comprises several activable elements, the third configuration corresponds to at least a second activable element being activated.

As illustrated on FIG. 1, an activable optical filter 10 according to the invention may comprise at least one cell 12 between two transparent supports 14 and 16.

At least one of the transparent supports 14, 16, for example both of the transparent supports, comprises at least one transparent electrode.

The cell 12 comprises at least two electrochromic dye compounds having different oxidation potentials and undergoing one optical property change upon application of an electrical field between the transparent supports using the at least two transparent electrodes.

Depending on the electric field applied, in other words voltage applied, all dyes or some dyes are activated.

In other words, each electrochromic dye compound may be an activable element of the activable optical filter.

For example, dyes with an intermediate oxidation potential may be uncolored in an oxidation state and yellow in another oxidation state and dyes with higher oxidation potential may be uncolored in an oxidation state and blue in another oxidation state.

When no voltage is applied, i.e. in the non activated configuration, no oxido-reduction reaction is induced, therefore the spectacle lens is clear corresponding to the first configuration of the activable filter.

When an intermediate voltage is applied oxido-reduction reaction is possible

Part of the dye are reduced and turn to yellow. The spectacle lens has a yellow color corresponding to the second configuration of the activable filter.

By increasing the voltage, the purple, or red and blue, dyes are also activated and the resulting color of the lens is grey: yellow and purple.

The electrochromic dye compound may be chosen in the list consisting of compounds comprising one or several pyridinium rings, such as single viologen, two-core viologens, terpyridinium compounds, quaterpyridinium compounds, in particular compounds disclosed in European patent applications EP2848667, EP2848668 and EP3115433.

Alternatively, according to a further embodiment of the invention, the activable optical filter comprises two independent electrochromic cells each comprising a different electrochromic dye compound.

The two independent electrochromic cells each have a specific color allowing to obtain four different configurations corresponding to both cells clear, the first cell clear and the second cell colored, the first cell colored and the second cell clear and finally both cell colored.

In other words, each independent electrochromic cell comprising a different electrochromic dye compound may be an activable element of the activable optical filter.

Advantageously, such embodiment allows having four configurations one of which corresponds to a clear configuration another to a dark configuration and the last two configurations may correspond to different colors adapted for different functions.

Alternatively, the activable optical filter according to the invention may comprise an electrochromic cell comprising an electrochromic dye compound, i.e. the first element of the activable optical filter and a second element of the activable optical filter configured to filter light radiations over at least one predetermined range of wavelengths, wherein the full width at half maximum of the filtering function of the activable optical filter is smaller than or equal to 100 nm.

In a specific embodiment, first configuration corresponds to a non activated state, in which both electrochromic cell and second element are non activated and the spectacle lens is clear. Second configuration corresponds to an activated state of the second element, the electrochromic cell being activated or not. Third configuration corresponds to activated electrochromic cell and non activated second element, providing for a dark state without color perception distortion.

An embodiment to implement the second element of the activable optical filter according to the invention is to match or not the refractive index of a surface hologram with a liquid crystal formulation.

The orientation of the liquid crystals in the formulation changes upon application of an electric field and hence the refractive index seen by the light passing through the filter changes.

As illustrated on FIG. 2, the cell comprises at least a first holographic grating 20 on one of the inner surfaces of the transparent support. The first holographic grating 20 is configured so as to reflect light radiations in the predetermined range of wavelengths.

The refractive index of the transparent material changes upon application of an electrical field between the transparent supports using the at least one transparent electrode from a first value substantially equal to the refractive index of the material used for the holographic grating to a second value different from the refractive index of the material used for the first holographic grating.

When the refractive index of the liquid crystal formulation (as seen by the light passing through the filter) is equal to that of the material used for the holographic grating, the reflecting effect of the filter "disappears". In other words, the cell is substantially transparent even over the predetermined range of wavelengths to be filtered.

When the refractive index of the liquid crystal formulation (as seen by the light passing through the filter) is different from that of the material used for the holographic grating, the reflecting effect of holographic grating 20 "appears" for the predetermined range of wavelengths.

Therefore, by controlling the orientation and hence the optical index of the liquid crystal formulation comprised in the cell, one may control the filtering property of the cell. Using a holographic grating 20 as a reflecting element provides a narrow full width at half maximum of the filtering function, for example the full width at half maximum of the filtering function may be of about 20 nm.

According to a further embodiment, the cell may further comprise a second holographic grating on the inner surface of the transparent support opposite to the one comprising the first holographic grating, the second holographic grating being configured so as to reflect light radiations in a range of wavelengths identical or different from the one of the first holographic grating.

Advantageously, such configuration allows having a double band-stop filter that may filter light radiations over two distinct bandwidths.

So as to be able to alternatively filter the two distinct bandwidths, the second holographic grating may be made of a material having a refractive index different from the one used for the first holographic grating.

Advantageously the optical filter may be switched from one range of wavelengths to the other by changing the refractive index of the transparent materiel between the two transparent supports.

According to a further embodiment of the invention illustrated on FIGS. 3a and 3b, the second element of the activable optical filter comprises at least one cell comprising a transparent liquid crystal formulation between two transparent supports, at least one of the transparent supports comprises a transparent electrode. The transparent liquid crystal formulation has a cholesteric phase with a pitch in the predetermined bandwidth of wavelengths to be filtered, the pitch of the cholesteric phase being controlled by the amount of chiral dopant introduced in the formulation and by its helical twisting power and by an electrical field between the transparent supports using the at least one transparent electrode.

Cholesteric liquid crystals are also known as chiral nematic liquid crystals. They are organized in layers with no positional ordering within layers, but a director axis which varies with layers. The variation of the director axis tends to be periodic in nature. The period of this variation, i.e. the distance over which a full rotation of 360° is completed, is known as the pitch, p. This pitch determines the wavelength of light which is reflected (Bragg reflection).

When applying an electrical field between the two transparent supports, the orientation of the liquid crystals changes and allows for example to move from a state where the cholesteric liquid crystals reflect the desired wavelengths to a state where they are oriented differently and do not reflect anymore or are oriented identically and increase light reflection.

Figures 4A, 4B:
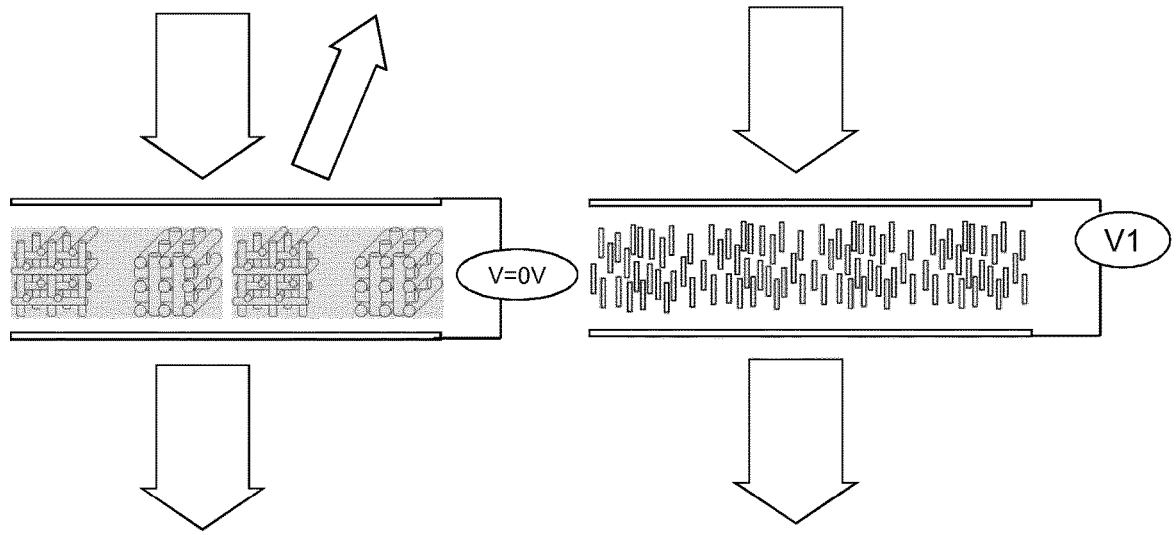
Figures 5A, 5B:
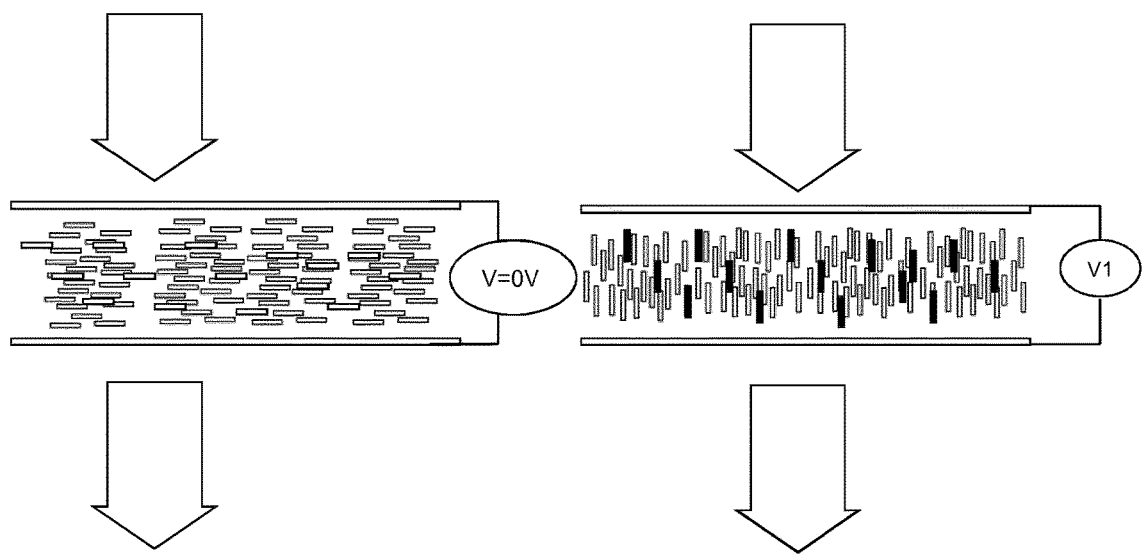

As illustrated on FIG. 4, according to an embodiment, the transparent liquid crystal formulation placed between the two transparent supports may be in a blue phase organization with a size of the cubic mesh in the predetermined range of wavelengths to be filtered. The blue phase organization has to be stabilized in the useful range of temperature by a method known from the state of the art. The cubic mesh of the blue phase may be controlled by the electrical field between the transparent supports using the at least one transparent electrode.

As illustrated on FIG. 5, the transparent material placed between the two transparent supports may comprise at least a liquid crystal matrix whose orientation changes upon application of an electrical field and at least one dichroic dye having its absorption range in the predetermined range of wavelengths to be filtered.

The dichroic dyes are chosen to have an absorption spectrum in the area of desired wavelengths. Once incorporated in the liquid crystal matrix they provide an absorbing effect.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot

The invention claimed is:

1. A spectacle lens comprising an activable optical filter, the activable optical filter comprising several activable elements and being configured to be actively switched between at least three configurations, wherein
   in the first configuration, all activable elements are non-activated, and the color perception of the spectacle wearer is unaltered and light transmitted through the activable optical filter has a chroma $C*1$ and hue $h°1$,
   in the second configuration, at least a first activable element being activated and light transmitted through the activable optical filter has a chroma $C*2$ and hue $h°2$,
   in the third configuration, at least a second activable element being activated and vision of the spectacle wearer is protected against glare and light transmitted through the activable optical filter has a chroma $C*3$ and hue $h°3$, and
   the chromaticity difference $\Delta$Chrom between $(C*2, h°2)$ and $(C*3, h°3)$ is larger than or equal to 20,
   wherein each activable element comprises an electrochromic dye compound, or an electrochromic cell comprising an electrochromic dye compound, or is configured to filter light radiations over at least one predetermined range of wavelengths, wherein the full width at half maximum of the filtering function of the activable optical filter is smaller than or equal to 100 nm.

2. The spectacle lens according to claim 1, wherein in the first configuration the activable optical filter has a transmittance T1 greater than or equal to 80% and/or light transmitted through the activable optical filter has chroma $C*1$ smaller than or equal to 15.

3. The spectacle lens according to claim 1, wherein the first configuration corresponds to a non activated configuration of the activable optical filter.

4. The spectacle lens according to claim 1, wherein in the third configuration the activable optical filter has a transmittance T3 smaller than or equal to 8%.

5. The spectacle lens according to claim 1, wherein in the third configuration light transmitted through the activable optical filter has a neutral color or has a chromaticity difference $\Delta$Chrom between $(C*1, h°1)$ and $(C*3, h°3)$ smaller than or equal to 20.

6. The spectacle lens according to claim 1, wherein in the second configuration light transmitted through the activable optical filter has a chroma $C*2$ larger than or equal to 75.

7. The spectacle lens according to claim 1, wherein in the second configuration light transmittance T2 through the activable optical filter is reduced by at least 10% as compared to the transmittance T1 of first configuration, on a range of wavelength selected in the following list of wavelength ranges: from 400 nm to 460 nm, from 420 nm to 450 nm, from 465 nm to 495 nm, from 480 nm to 520 nm, from 460 nm to 520 nm, from 560 nm to 600 nm, from 580 nm to 620 nm and from 530 nm to 650 nm.

8. The spectacle lens according to claim 1, wherein the activable optical filter comprises at least one cell comprising two electrochromic dye compounds having different oxidation potentials between two transparent supports and at least two transparent electrodes, the electrochromic dye compounds undergoing at least one optical property change upon application of an electrical field between the transparent supports using at least two transparent electrodes.

9. The spectacle lens according to claim 8, wherein at least one of the electrochromic dye compounds is in the list consisting of compounds comprising one or several pyridinium rings.

10. The spectacle lens according to claim 1, wherein the activable optical filter comprises two independent electrochromic cells each comprising a different electrochromic dye compound.

11. The spectacle lens according to claim 1, wherein the activable optical filter comprises an electrochromic cell comprising an electrochromic dye compound and a second element configured to filter light radiations over at least one predetermined range of wavelengths, wherein the full width at half maximum of the filtering function of the activable optical filter is smaller than or equal to 100 nm.

12. The spectacle lens according to claim 1, having an ophthalmic function adapted to a wearer.

13. An optical equipment comprising the spectacle lens according to claim 1, and a control unit configured to control the activable optical filter so as to have the activable optical filter switch between the at least three configurations.

14. The optical equipment according to claim 13, further comprising at least one sensor configured to sense a luminosity parameter and wherein the control unit is configured to control the activable optical filter based on the luminosity parameter provided by the sensor.

15. The spectacle lens according to claim 1, wherein each electrochromic dye compound is positioned in one cell, the electrochromic dye compounds have different oxidation potentials between two transparent supports and at least two transparent electrodes, the electrochromic dye compounds undergo at least one optical property change upon application of an electrical field between the transparent supports using the at least two transparent electrodes.

16. The spectacle lens according to claim 1, each electrochromic cell comprising a different electrochromic dye compound.

17. The spectacle lens according to claim 1, comprising a first activable element comprising an electrochromic cell comprising an electrochromic dye compound and a second activable element configured to filter light radiations over at least one predetermined range of wavelengths, wherein the full width at half maximum of the filtering function of the activable optical filter is smaller than or equal to 100 nm.

* * * * *